United States Patent
Han et al.

(10) Patent No.: US 9,214,670 B2
(45) Date of Patent: Dec. 15, 2015

(54) POSITIVE ELECTRODE MATERIAL FOR LITHIUM BATTERY, POSITIVE ELECTRODE PREPARED FROM THE POSITIVE MATERIAL, AND LITHIUM BATTERY INCLUDING THE POSITIVE ELECTRODE

(75) Inventors: Seung-Hun Han, Yongin-si (KR); Jun-Kyu Cha, Yongin-si (KR); Hye-Sun Jeong, Yongin-si (KR); Ki-Jun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 507 days.

(21) Appl. No.: 13/564,489

(22) Filed: Aug. 1, 2012

(65) Prior Publication Data

US 2013/0177812 A1    Jul. 11, 2013

(30) Foreign Application Priority Data

Jan. 6, 2012 (KR) .................. 10-2012-0002019

(51) Int. Cl.
| | |
|---|---|
| *H01M 4/36* | (2006.01) |
| *H01M 4/131* | (2010.01) |
| *H01M 4/505* | (2010.01) |
| *H01M 4/525* | (2010.01) |
| *H01M 4/66* | (2006.01) |
| *H01M 10/0525* | (2010.01) |
| *H01M 4/62* | (2006.01) |
| *H01M 4/02* | (2006.01) |

(52) U.S. Cl.
CPC .............. *H01M 4/364* (2013.01); *H01M 4/131* (2013.01); *H01M 4/505* (2013.01); *H01M 4/525* (2013.01); *H01M 4/628* (2013.01); *H01M 4/661* (2013.01); *H01M 10/0525* (2013.01); *H01M 4/621* (2013.01); *H01M 4/622* (2013.01); *H01M 4/625* (2013.01); *H01M 2004/028* (2013.01); *Y02E 60/122* (2013.01); *Y02T 10/7011* (2013.01)

(58) Field of Classification Search
CPC ..... H01M 4/131; H01M 4/621; H01M 4/625; H01M 4/661; H01M 10/0525; H01M 2004/028; H01M 4/364; Y02E 60/122
USPC ........ 429/217, 218.1, 231.1, 231.3, 233, 245, 429/232; 252/182.1
See application file for complete search history.

(56) References Cited

U.S. PATENT DOCUMENTS

| | | | |
|---|---|---|---|
| 6,455,202 B1 | 9/2002 | Marugan et al. | |
| 2009/0087739 A1 | 4/2009 | Takahashi | |
| 2011/0111290 A1 | 5/2011 | Uchida et al. | |
| 2011/0315918 A1 | 12/2011 | Kawai et al. | |
| 2012/0115030 A1* | 5/2012 | Tanaka et al. ................. | 429/211 |

FOREIGN PATENT DOCUMENTS

| | | | |
|---|---|---|---|
| CN | 101877422 | * | 11/2010 |
| CN | 101877422 A | | 11/2010 |
| JP | 2000-294252 A | | 10/2000 |
| JP | 4114247 B2 | | 7/2008 |
| JP | 2008-226515 A | | 9/2008 |
| JP | 2010-21075 A | | 1/2010 |
| KR | 10-2005-0038899 | | 4/2005 |

OTHER PUBLICATIONS

English Machine Translation of Japanese Publication No. 2000-106174, published Apr. 11, 2000, for corresponding Japanese Patent JP 4114247 B2 listed above, 19 pages.
English Machine Translation of Japanese Publication No. 2008-226515 listed above, 30 pages, 2008.
Extended European Search Report dated Mar. 27, 2013 in European patent application No. 13150300.5 (5 pages).
SIPO Office action dated Jun. 2, 2015, with English translation, corresponding to Chinese Patent application 201310003042.6, (14 pages).
English machine translation of Chinese Publication 101877422 dated Nov. 3, 2010, listed above, (19 pages).

* cited by examiner

*Primary Examiner* — Laura Weiner
(74) *Attorney, Agent, or Firm* — Christie, Parker & Hale, LLP

(57) ABSTRACT

A positive electrode material for a lithium battery, a positive electrode prepared from the positive electrode material, and a lithium battery including the positive electrode are disclosed. The positive electrode material includes a positive active material, an aqueous binder, and tungsten trioxide. Due to the inclusion of the positive active material, the aqueous binder, and the tungsten trioxide ($WO_3$), the positive electrode material may substantially prevent corrosion of an aluminum substrate. The positive electrode material has high electric conductivity. Lithium batteries including positive electrodes prepared from the positive electrode material have decreased resistance of the electrode plate, high rate characteristics, and good lifespan characteristics.

11 Claims, 3 Drawing Sheets

POSITIVE ELECTRODE MATERIAL FOR LITHIUM BATTERY, POSITIVE ELECTRODE PREPARED FROM THE POSITIVE MATERIAL, AND LITHIUM BATTERY INCLUDING THE POSITIVE ELECTRODE

RELATED APPLICATIONS

This application claims priority to and the benefit of Korean Patent Application No. 10-2012-0002019, filed on Jan. 6, 2012 in the Korean Intellectual Property Office, the entire content of which is incorporated herein by reference.

BACKGROUND

1. Field

One or more embodiments of the present invention relate to a positive electrode material for a lithium battery, a positive electrode prepared from the positive electrode material, and a lithium battery including the positive electrode.

2. Description of the Related Art

Secondary lithium batteries produce electric energy due to oxidation and reduction reactions occurring when lithium ions are intercalated into or deintercalated from a positive electrode and a negative electrode. Each of the positive and negative electrodes includes an active material that enables the intercalation and deintercalation of the lithium ions. An organic electrolytic solution or a polymer electrolytic solution is positioned between the positive electrode and the negative electrode.

As a positive active material for a secondary lithium battery, for example, an oxide that has a structure that enables the intercalation of lithium ions and includes lithium and a transition metal may be used. Examples of the oxide are lithium cobalt oxide ($LiCoO_2$), lithium nickel oxide ($LiNiO_2$), and lithium nickel cobalt manganese oxide ($Li[NiCoMn]O_2$, $Li[Ni_{1-x-y}Co_xMn_y]O_2$).

If a positive electrode plate includes a positive active material for a secondary lithium battery and an aqueous binder, alkali metal ions in the positive active material that do not react or that are dissolved in water may contribute to a substantial increase in the pH of the prepared positive active material slurry. Thus, the positive active material slurry is strongly basic.

When the aqueous positive active material slurry is coated on an aluminum electrode substrate, however, due to its high pH, the aluminum electrode substrate corrodes, generating $H_2$ gas, and many pin holes are formed on the electrode plate, thereby increasing the internal resistance of the positive electrode plate.

SUMMARY

According to one or more embodiments of the present invention, a positive electrode material for a lithium battery substantially prevents the corrosion of a metal substrate (e.g., an aluminum substrate) that is susceptible to corrosion by a strong alkali.

In one or more embodiments of the present invention, a positive electrode includes the positive electrode material.

According to one or more embodiments of the present invention, a lithium battery includes the positive electrode.

Additional aspects will be set forth in part in the description which follows and, in part, will be apparent from the description, or may be learned by practice of the presented embodiments.

According to one or more embodiments of the present invention, a positive electrode material for a lithium battery includes: a positive active material; an aqueous binder; and tungsten trioxide ($WO_3$).

According to an embodiment of the present invention, an average particle diameter of the tungsten trioxide ($WO_3$) may be about 10 nm to about 5 μm.

According to an embodiment of the present invention, an amount of the tungsten trioxide ($WO_3$) may be about 0.001 to about 50 parts by weight based on 100 parts by weight of the positive active material.

According to an embodiment of the present invention, the positive active material may include at least one of a lithium cobalt-based oxide, a lithium nickel cobalt manganese-based oxide, and a lithium nickel cobalt aluminum-based oxide.

According to an embodiment of the present invention, the aqueous binder may include at least one of carboxymethylcellulose, hydroxyethylcellulose, hydroxypropylcellulose, hydroxypropylmethylcellulose, polyvinylidenefluoride, polytetrafluoroethylene, polyethylene, polypropylene, polybutadiene, butyl rubber, fluorine rubber, polyethyleneoxide, polyvinylalcohol, polyacrylic acid or a salt thereof, polyvinylpyrrolidone, polyepichlorohydrin, polyphosphazene, polyacrylonitrile, polystyrene, polyvinylpyridine, chlorosulfonated polyethylene, latex, a polyester resin, an acryl resin, a phenol resin, an epoxy resin, a polymer of propylene and an olefin having 2 to 8 carbon atoms, and a copolymer of (meth) acrylic acid and (meth)acrylic acid alkyl ester.

According to an embodiment of the present invention, an amount of the aqueous binder may be about 0.1 to about 10 parts by weight based on 100 parts by weight of the positive active material.

According to an embodiment of the present invention, the positive electrode material may further include a conductive agent. In this regard, the conductive agent may include at least one of natural graphite, artificial graphite, carbon black, acetylene black, Ketjen black, carbon fiber, carbon nanotube, metal powder, metal fiber, and a conductive polymer.

According to one or more embodiments of the present invention, a positive electrode for a lithium battery includes: a metal substrate that is corroded by a strong alkali; and a positive electrode layer including the positive electrode material on at least one surface of the metal substrate.

According to one or more embodiments of the present invention, a lithium battery includes: the positive electrode; a negative electrode including a negative active material disposed facing the positive electrode; and an electrolyte between the positive electrode and the negative electrode.

BRIEF DESCRIPTION OF THE DRAWINGS

These and/or other aspects will become apparent and more readily appreciated from the following detailed description when considered in conjunction with the accompanying drawings in which.

DETAILED DESCRIPTION

Figure 1:
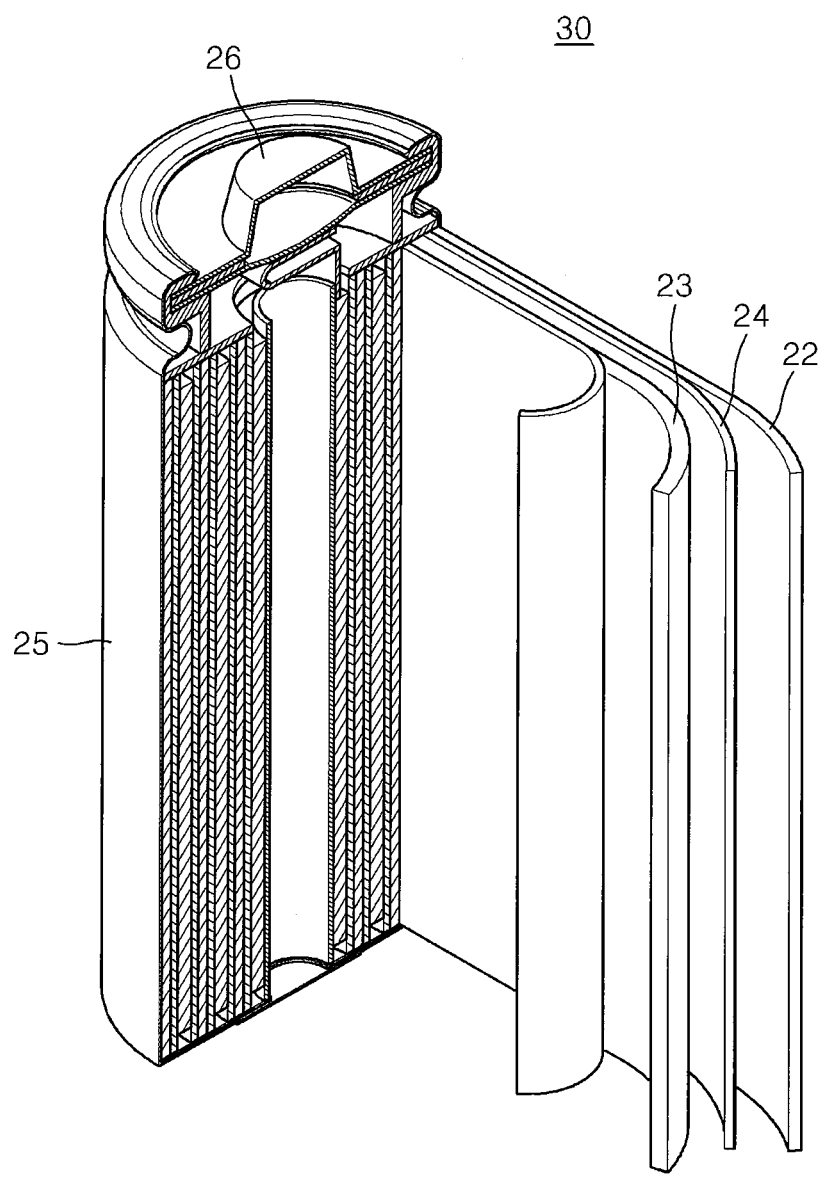
FIG. 1 is a schematic cross-sectional view of a lithium battery according to an embodiment of the present invention.

Certain exemplary embodiments will now be described in connection with the accompanying drawings, wherein like reference numerals refer to like elements throughout. As would be understood by those of ordinary skill in the art, the described embodiments may be modified in different ways, and therefore are not be construed as limited to the descriptions set forth herein. Accordingly, the exemplary embodiments are described with reference to the figures in order to explain the aspects of the present description.

Expressions such as "at least one of," when preceding a list of elements, modify the entire list of elements and do not modify the individual elements of the list.

Hereinafter, one or more embodiments of the present invention are described in detail.

A positive electrode material for a lithium battery, according to an embodiment of the present invention, includes a positive active material, an aqueous binder, and tungsten trioxide ($WO_3$). The positive electrode material may be an aqueous positive electrode material that includes water as a solvent.

Typically, an aluminum substrate (which is used as a current collector in a positive electrode of a lithium battery) has a thin oxide film formed of $Al_2O_3$ at its surface. In a neutral aqueous solution, the thin oxide film prevents aluminum metal from reacting with water. Thus, a hydrogen generation reaction according to Reaction Scheme 1 below does not occur.

$$2Al + 3H_2O \rightarrow Al_2O_3 + 3H_2 \uparrow \quad \text{(Reaction Scheme 1)}$$

However, in an alkaline aqueous solution, according to Reaction Scheme 2 below, aluminate ions elute into the solution from the alumina film, and thus, a reaction according to Reaction Scheme 3 below may occur at the surface of the aluminum substrate. Due to hydrogen gas produced at this time, pin holes are formed in the surface of the formed electrode.

$$Al_2O_3 + H_2O + 2OH^- \rightarrow 2AlO_2^- + 2H_2O \quad \text{(Reaction Scheme 2)}$$

$$2Al + 6OH^- + 6H_2O \rightarrow 2[Al(OH)_6]^{3-} + 3H_2 \uparrow \quad \text{(Reaction Scheme 3)}$$

The positive electrode material includes tungsten trioxide ($WO_3$), which is a strong oxidizer. Due to the inclusion of tungsten trioxide, the reaction according to Reaction Scheme 3 is suppressed and an alumina film may be formed according to Reaction Scheme 4 below.

$$2Al + 3WO_3 \rightarrow Al_2O_3 + 3WO_2 \quad \text{(Reaction Scheme 4)}$$

As described above, the corrosion of aluminum is substantially prevented due to the tungsten trioxide ($WO_3$) so that the formation of pin holes on the electrode plate is substantially prevented, thereby substantially preventing an increase in the resistance of the electrode. Also, the tungsten trioxide ($WO_3$) has an electrical resistivity as low as 19.25 nΩm. Due to such low electrical resistivity, the tungsten trioxide ($WO_3$) may provide good electric conductivity characteristics to the positive electrode material, thereby decreasing the resistance of the electrode plate and yielding a lithium battery having high rate characteristics and good lifespan characteristics.

The particle size of the tungsten trioxide is not limited. However, in some embodiments, for example, an average particle diameter of the tungsten trioxide may be about 5 μm or less, but should be a sufficient size such that the tungsten trioxide particles may be inserted into apertures between the positive active material particles, thereby increasing the density of the entire electrode plate. Also, the average particle size of the tungsten trioxide may be about 10 nm or greater in order to be highly dispersible using physical dispersion methods. Accordingly, an average particle size of the tungsten trioxide may be, for example, about 5 nm to about 1 μm, for example, about 10 nm to about 100 nm.

The amount of the tungsten trioxide in the positive electrode material is not limited. However, if the amount of the tungsten trioxide is too small, corrosion of the aluminum current collector may not be substantially prevented. On the other hand, if the amount of the tungsten trioxide is too large, the ratio of the positive active material in the electrode plate is reduced, and thus the capacity of the formed electrode may be reduced. Accordingly, these issues need to be taken into consideration in determining the amount of the tungsten trioxide. According to an embodiment of the present invention, the amount of the tungsten trioxide may be about 0.001 to about 50 parts by weight based on 100 parts by weight of the positive active material. For example, the amount of the tungsten trioxide may be about 0.001 to about 30 parts by weight, about 0.01 to about 20 parts by weight, about 0.1 to about 10 parts by weight, about 1 to about 10 parts by weight, about 1 to about 5 parts by weight, or about 1 to about 3 parts by weight, based on 100 parts by weight of the positive active material.

The positive active material included in the positive electrode material may be any one of various positive active materials that are not susceptible to the aqueous binder or the aqueous solvent, and that does not release metal ions. For example, the positive active material may include at least one of a lithium cobalt-based oxide, a lithium nickel cobalt-based manganese oxide, and a lithium nickel cobalt aluminum-based oxide, but is not limited thereto. Also, the positive active material may be doped with one or more different elements depending on the desired purpose.

Nonlimiting examples of the positive active material include the following compounds:

$Li_aA_{1-b}B_bD_2$ (where $0.90 \leq a \leq 1.8$, and $0 \leq b \leq 0.5$)

$Li_aE_{1-b}B_bO_{2-c}D_c$ (where $0.90 \leq a \leq 1.8$, $0 \leq b \leq 0.5$, and $0 \leq c \leq 0.05$)

$LiE_{2-b}B_bO_{4-c}D_c$ (where $0 \leq b \leq 0.5$, and $0 \leq c \leq 0.05$)

$Li_aNi_{1-b-c}Co_bB_cD_\alpha$ (where $0.90 \leq a \leq 1.8$, $0 \leq b \leq 0.5$, $0 \leq c \leq 0.05$, and $0 \leq \alpha \leq 2$)

$Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$)

$Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$)

$Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$)

$Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$)

$Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$)

$Li_aNi_bE_cG_dO_2$ (where $0.90 \leq a \leq 1.8$, $0 \leq b \leq 0.9$, $0 \leq c \leq 0.5$, and $0.001 \leq d \leq 0.1$)

$Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, and $0.001 \leq e \leq 0.1$)

$Li_aNiG_bO_2$ (where $0.90 \leq a \leq 1.8$ and $0.001 \leq b \leq 0.1$)

$Li_aCoG_bO_2$ (where $0.90 \leq a \leq 1.8$ and $0.001 \leq b \leq 0.1$)

$QO_2$ $QS_2$ $LiQS_2$ $V_2O_5$ $LiV_2O_5$ $LiIO_2$ $LiNiVO_4$ $Li_{(3-f)}J_2(PO_4)_3$ ($0 \leq f \leq 2$)

In the chemical formulae above, A may be Ni, Co, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

These compounds may each have a coating layer on their surfaces, or may be mixed with a compound having a coating layer. The coating layer may include a coating element compound, such as an oxide of a coating element, a hydroxide of a coating element, an oxyhydroxide of a coating element, an oxycarbonate of a coating element, or a hydroxycarbonate of a coating element. The compounds of the coating layer may be amorphous or crystalline. A coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed by any coating method that does not adversely affect the properties of the positive active material (for example, evaporation, spray coating, or precipitation may be used.) These methods are known to those of ordinary skill in the art.

For example, $LiNiO_2$, $LiCoO_2$, $LiNi_{1-x}Mn_xO_2 (0<x<1)$, $LiNi_{1-x-y}Co_xMn_yO_2$ ($0 \leq x \leq 0.5$ and $0 \leq y \leq 0.5$), $LiFeO_2$, $V_2O_5$, $TiS$, $MoS$, or the like may be used.

The positive electrode material is an aqueous system and thus uses an aqueous binder in which water is used as a solvent. The aqueous binder (unlike a non-aqueous binder such as N-methyl-pyrrolidone (NMP)) is available even in the presence of humidity, and thus, a dry room and recycling process are not needed. Thus, the aqueous binder is environmentally friendly and its use may contribute to the simplification of mass-production equipment. Also, the aqueous binder has a binding mechanism that is not significantly affected by the specific surface area of the electrode material. Due to this binding mechanism, the aqueous binder is used in various materials having large specific surface areas. Also, the aqueous binder has low reactivity with respect to the electrolytic solution, and due to this low reactivity, the aqueous binder is appropriate for use in lithium batteries where is yields high stability (heat dissipation).

Nonlimiting examples of the aqueous binder include carboxymethylcellulose, hydroxyethylcellulose, hydroxypropylcellulose, hydroxypropylmethylcellulose, polyvinylidenefluoride, polytetrafluoroethylene, polyethylene, polypropylene, polybutadiene, butyl rubber, fluorine rubber, polyethyleneoxide, polyvinylalcohol, polyacrylic acid and salts thereof, polyvinylpyrrolidone, polyepichlorohydrin, polyphosphazene, polyacrylonitrile, polystyrene, polyvinylpyridine, chlorosulfonated polyethylene, latex, polyester resins, acryl resins, phenol resins, epoxy resins, polymers of propylene and an olefin having 2 to 8 carbon atoms, and copolymers of (meth)acrylic acid and (meth)acrylic acid alkyl ester, and combinations thereof. For example, any one of various aqueous binders that are used in the art may be used as the aqueous binder.

The aqueous binder may be used in an amount appropriate to provide a binding force between dispersed positive active material particles and between positive active material particles and the current collector. The amount of the aqueous binder is not limited. For example, an amount of the aqueous binder may be about 0.1 to about 10 parts by weight based on 100 parts by weight of the positive active material. In another example, the amount of the aqueous binder may be about 0.5 to about 5 parts by weight, for example, about 1 to about 3 parts by weight, based on 100 parts by weight of the positive active material.

The positive electrode material may further include a conductive agent. The conductive agent may increase the conductivity of the positive electrode material. The conductive agent may include, for example, at least one of natural graphite, artificial graphite, carbon black, acetylene black, ketjen black, carbon fiber, carbon nanotube, metal powder, metal fiber, and a conductive polymer. These conductive agents may be used alone or in combination. However, the conductive agent is not limited thereto, and may be any one of various conductive agents that are used in the art.

The positive electrode material described above substantially prevents corrosion of the current collector (e.g., an aluminum substrate), and provides high electric conductivity, thereby reducing the resistance of the electrode plate and yielding a lithium battery having high rate characteristics and good lifespan characteristics.

A positive electrode for a lithium battery, according to an embodiment of the present invention, includes a metal substrate that is susceptible to corrosion by a strong alkali, and a positive electrode layer including the positive electrode material disposed on at least one surface of the metal substrate.

The metal substrate included in the positive electrode may be any one of various substrates that function as a current collector, that do not cause any chemical change in the formed battery, and that have high conductivity. Nonlimiting examples of the metal substrate include stainless steel, aluminum, nickel, titanium, calcined carbon, and aluminum or stainless steel that has been surface-treated with carbon, nickel, titanium, silver, or the like. One particular example of a metal substrate that is corroded by a strong alkali is an aluminum substrate. In this case, the corrosion of the aluminum substrate may be effectively prevented by using the above-described positive electrode material. The thickness of the metal substrate may be about 3 to about 500 μm, but is not limited thereto.

The positive electrode may be formed by, for example, forming a slurry composition including the positive electrode material into a predetermined shape, or coating the slurry composition on an aluminum foil (as the metal substrate).

In more detail, a slurry composition including the positive electrode material may be directly coated on the metal substrate, followed by drying, to form a positive electrode layer. Alternatively, the slurry composition may be cast on a separate support to form a film, and then the film may be separated from the support and laminated on the metal substrate to form the positive electrode layer. The positive electrode is not limited to the above description, and may also be formed using other methods.

A lithium battery according to an embodiment of the present invention includes the positive electrode. For example, the lithium battery may include: a positive electrode including the positive electrode material; a negative electrode including a negative active material disposed facing the positive electrode; and an electrolyte between the positive electrode and the negative electrode. An example of a method of manufacturing the lithium battery is described in detail below.

First, the positive electrode is manufactured in the same manner as described above.

The negative electrode may be formed as follows: a negative active material, a binder, and optionally, a conductive agent are mixed in a solvent to prepare a negative electrode slurry composition. Then, the negative electrode slurry composition is formed into the desired shape, or the negative electrode slurry composition is directly coated on a metal current collector (such as a copper foil), followed by drying, to form a negative electrode plate. Alternatively, the negative electrode slurry composition is cast on a separate support to form a film, and then the film is separated from the support and laminated on the metal current collector to manufacture the negative electrode plate.

The negative active material may be any one of various negative active materials that intercalate and deintercalate lithium that are used in the art. For example, lithium metal, lithium alloy, metals that are alloyable with lithium or oxides thereof, transition metal oxides, carbonaceous materials, graphite, and mixtures thereof may be used.

For example, the transition metal oxide may be vanadium oxide, lithium vanadium oxide, or the like.

For example, the metal that is alloyable with lithium or an oxide thereof may be Si, $SiO_x(0<x\leq2)$, an Si—Y alloy (where Y is an alkali metal, alkali earth metal, a Group 13 element, a Group 14 element, transition metal, a rare earth element, or a combination thereof, and is not Si), Sn, $SnO_2$, or Sn—Y (where Y is an alkali metal, alkali earth metal, a Group 13 element, a Group 14 element, transition metal, a rare earth element, or a combination thereof, and is not Sn). Also, at least one of these may be mixed with $SiO_2$. In some embodiments, the element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the carbonaceous material and/or graphite may be crystalline carbon, amorphous carbon, or a mixture thereof. The crystalline carbon may be, for example, natural or artificial graphite that is amorphous, tubular-shaped, flake-shaped, spherical, or fibrous-shaped, and examples of the amorphous carbon include soft carbon (cold calcined carbon) or hard carbon, mesophase pitch carbide, and calcined coke.

The conductive agent, the binder, and the solvent used in the negative electrode slurry composition may be the same as or different from those of the positive electrode slurry composition. The solvent may be water or an organic solvent. The binder may be an aqueous or a non-aqueous binder.

Nonlimiting examples of the binder included in the negative electrode slurry composition include styrene-butadiene rubber, acrylated styrene-butadiene rubber, acrylonitrile-butadiene rubber, acrylonitrile-butadiene-styrene rubber, carboxymethylcellulose, hydroxyethylcellulose, hydroxypropylcellulose, hydroxypropylmethylcellulose, polyvinylidenefluoride, polytetrafluoroethylene, polyethylene, polypropylene, polybutadiene, butyl rubber, fluorine rubber, polyethyleneoxide, polyvinylalcohol, polyacrylic acid and salts thereof, polyvinylpyrrolidone, polyepichlorohydrin, polyphosphazene, polyacrylonitrile, polystyrene, polyvinylpyridine, chlorosulfonated polyethylene, latex, polyester resin, acryl resins, phenol resins, epoxy resins, polymers of propylene and an olefin having 2 to 8 carbon atoms, copolymers of (meth)acrylic acid and (meth)acrylic acid alkyl ester, vinylidene fluoride/hexafluoropropylene copolymers, polymethylmethacrylate, and combinations thereof. However, the binder is not limited thereto, and may be any one of various materials that are used as a binder in the art.

As the solvent, N-methylpyrrolidone, acetone, or water may be used. However, the solvent is not limited thereto, and may be any one of various materials that are used in the art.

Amounts of the negative active material, the conductive agent, the binder, and the solvent are the same as the levels that are conventionally used in lithium batteries. According to the purpose or structure of the lithium battery, at least one of the conductive agent, the binder, and the solvent may be omitted.

The positive electrode and the negative electrode may be separated from each other by a separator, and any separator that is conventionally used in lithium batteries may be used herein. For example, a separator that has a low resistance to the migration of the ions of an electrolyte and an good electrolytic solution-retaining ability may be used. For example, the separator may be selected from glass fiber, polyester, Teflon, polyethylene, polypropylene, polytetrafluoroethylene (PTFE), and combinations thereof, each of which may be nonwoven or woven. For example, a separator for use in a lithium ion battery may be a foldable separator formed of polyethylene or polypropylene, and a separator for use in a lithium ion polymer battery may be a separator having good organic electrolytic solution-retaining capability. An example of a method of manufacturing the separator is now described in detail below. The separator may have a pore diameter of about 0.01 to about 10 μm, and a thickness of about 5 to about 300 μm.

A separator composition may be prepared by mixing a polymer resin, a filler, and a solvent. The separator composition may be directly coated and dried on an electrode to complete the preparation of the separator. Alternatively, the separator composition may be cast and dried on a support to form a film which is then separated from the support and laminated on an electrode to complete the preparation of the separator.

A polymer resin that may be used to produce the separator may be any material that is used in the binder of an electrode plate. For example, the polymer resin may be a vinylidene-fluoride/hexafluoropropylene copolymer, polyvinylidene-fluoride (PVDF), polyacrylonitrile, polymethylmethacrylate, or a mixture thereof.

The electrolyte between the positive electrode and the negative electrode may be a non-aqueous electrolyte that contains a lithium salt. The non-aqueous electrolyte may be a non-aqueous electrolytic solution, a solid electrolyte, or an inorganic solid electrolyte.

The non-aqueous electrolytic solution may include, for example, an aprotic organic solvent (nonlimiting examples of which include N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethyl-sulfoxide, 1,3-dioxolane, formamide, dimethylformamide, acetonitrile, nitromethane, methyl formic acid, methyl acetic acid, phosphoric acid triester, trimethoxy methane, dioxolane derivatives, sulfolanes, methyl sulfolanes, 1,3-dimethyl-2-imidazolidinone, propylene carbonate derivatives, tetrahydrofuran derivatives, ethers, methyl propionic acid, and ethyl propionic acid).

The organic solid electrolyte may be, for example, a polyethylene derivative, a polyethylene oxide derivative, a polypropylene oxide derivative, an ester phosphate polymer, poly agitation lysine, polyester sulfide, polyvinyl alcohol, polyvinylidenefluoride, or a polymer including an ionic dissociable group.

The inorganic solid electrolyte may be, for example, a nitride, halide, or sulfate of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt may be any one of various materials that are conventionally used in lithium batteries. As a material that is easily dissolved in the non-aqueous electrolyte, for example, at least one of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carbonic acid, lithium 4 phenyl borate, and imide may be used.

Lithium batteries can be categorized as lithium ion batteries, lithium ion polymer batteries, and lithium polymer batteries, depending on the composition of the separator and the electrolyte. Also, lithium batteries can be categorized as cylindrical batteries, rectangular batteries, coin-type batteries, and pouch-type batteries, depending on the shape. Additionally, lithium batteries can be categorized as bulk batteries and thin film batteries, depending on the size. Also, lithium batteries may be primary lithium batteries or secondary lithium batteries.

Methods of making these batteries are known in the art.

FIG. 1 is a schematic cross-sectional view of a lithium battery 30 according to an embodiment of the present invention.

Referring to FIG. 1, the lithium battery 30 includes a positive electrode 23, a negative electrode 22, and a separator 24 between the positive electrode 23 and the negative electrode 22. The positive electrode 23, the negative electrode 22, and the separator 24 are wound or folded and placed in a battery case 25. Subsequently, an electrolyte is injected into the battery case 25, followed by sealing with a sealing member 26, thereby completing the manufacture of the lithium battery 30. The battery case 25 may be cylindrical, rectangular, or thin film-shaped. The lithium battery may be a lithium ion battery.

The lithium battery may be used in a mobile phone or a portable computer, as well as in an electric vehicle, which is an application that requires high capacity, high output, and high-temperature driving. Also, a combination of the lithium battery with existing internal combustion engines, fuel batteries, or super capacitors may be used to power a hybrid vehicle. Also, the lithium battery may be used in various other applications that require high power output, high voltage, and high-temperature driving.

The above one or more embodiments of the present invention are further described below with reference to certain examples. These examples, however, are presented for illustrative purposes only and do not restrict the scope of the present invention.

Example 1

480 g of $Li[Ni_{1/3}Co_{1/3}Mn_{1/3}]O_2$ powder, 10 g of acetylene black, 5 g of carboxymethylcellulose, 0.48 g of $WO_3$ nanopowder having an average particle diameter of about 90 nm, and 90 g of water were loaded into a mixer and mixed to prepare a mixture. Then, 210 g of water and 12.5 g of acryl-based copolymer emulsion (Japan, Xeon Company, AX-4069) were added to the mixture to complete the preparation of a positive electrode slurry composition.

The positive electrode slurry composition was coated to a thickness of 110 μm on an aluminum substrate having a thickness of 15 μm using a bar coater, and then dried in an oven at a temperature of 110° C. for 10 minutes to complete the manufacture of a positive electrode.

Example 2

A positive electrode slurry composition and a positive electrode were manufactured in the same manner as in Example 1, except that 2.4 g of $WO_3$ was used.

Example 3

A positive electrode slurry composition and a positive electrode were manufactured in the same manner as in Example 1, except that 4.8 g of $WO_3$ was used.

Example 4

A positive electrode slurry composition and a positive electrode were manufactured in the same manner as in Example 1, except that 14.4 g of $WO_3$ was used.

Example 5

A positive electrode slurry composition and a positive electrode were manufactured in the same manner as in Example 1, except that 48 g of $WO_3$ was used.

Comparative Example 1

A positive electrode slurry composition and a positive electrode were manufactured in the same manner as in Example 1, except that $WO_3$ was not used.

Comparative Example 2

A positive electrode slurry composition and a positive electrode were manufactured in the same manner as in Example 1, except that 4.8 g of $MoO_3$ was used instead of $WO_3$.

Comparative Example 3

A positive electrode slurry composition and a positive electrode were manufactured in the same manner as in Example 1, except that 24 g of $MoO_3$ was used instead of $WO_3$.

Comparative Example 4

A positive electrode slurry composition and a positive electrode were manufactured in the same manner as in Example 1, except that 48 g of $MoO_3$ was used instead of $WO_3$.

Manufacturing of Lithium Battery Half Cell

Example 6

A coin cell (CR2032 type) having a diameter of 20 mm was manufactured using the positive electrode plate manufactured according to Example 1.

In manufacturing the coin cell, lithium metal was used as the reference electrode, and as the electrolyte, a mixed solvent of ethylene carbonate (EC) and diethyl carbonate (DEC) (volumetric ratio of 3:7) in which 1.3M $LiPF_6$ was dissolved was used.

Example 7

A coin cell was manufactured in the same manner as in Example 6, except that the positive electrode plate manufactured according to Example 2 was used.

Example 8

A coin cell was manufactured in the same manner as in Example 6, except that the positive electrode plate manufactured according to Example 3 was used.

Example 9

A coin cell was manufactured in the same manner as in Example 6, except that the positive electrode plate manufactured according to Example 4 was used.

Example 10

A coin cell was manufactured in the same manner as in Example 6, except that the positive electrode plate manufactured according to Example 5 was used.

Comparative Example 5

A coin cell was manufactured in the same manner as in Example 6, except that the positive electrode plate manufactured according to Comparative Example 1 was used.

Comparative Example 6

A coin cell was manufactured in the same manner as in Example 6, except that the positive electrode plate manufactured according to Comparative Example 2 was used.

Comparative Example 7

A coin cell was manufactured in the same manner as in Example 6, except that the positive electrode plate manufactured according to Comparative Example 3 was used.

Comparative Example 8

A coin cell was manufactured in the same manner as in Example 6, except that the positive electrode plate manufactured according to Comparative Example 4 was used.

Evaluation Example 1

Appearance Evaluation on Surfaces of Positive Electrode Plates

Figure 2:
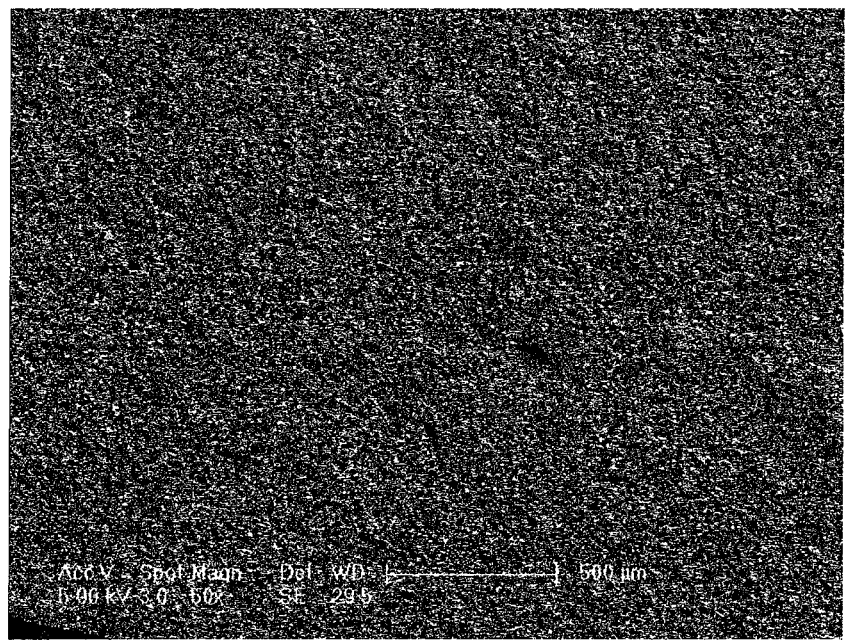
FIG. 2 is a scanning electron microscope (SEM) image of the surface of a positive electrode plate manufactured according to Example 3.
Figure 3:
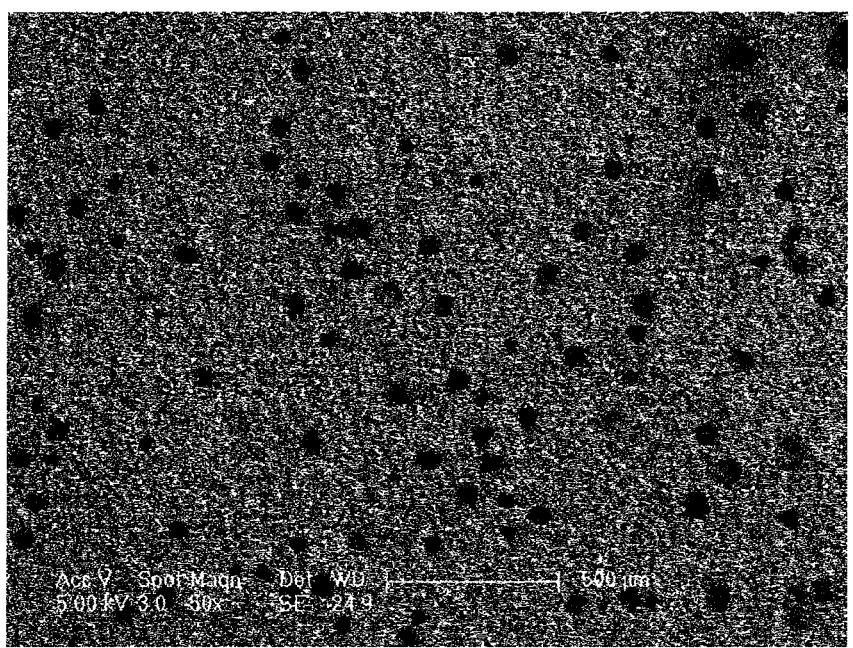
FIG. 3 is an SEM image of the surface of a positive electrode plate manufactured according to Comparative Example 1.

FIGS. 2 and 3 are scanning electron microscope (SEM) images of the surfaces of the positive electrode plates manufactured according to Example 3 and Comparative Example 1.

As shown in FIG. 2, the surface of the positive electrode plate of Example 3 did not have pores or cracks. However, as shown in FIG. 3, the surface of the positive electrode plate of Comparative Example 1 had pores and cracks.

From these results, it was confirmed that the corrosion of aluminum was suppressed due to the inclusion of $WO_3$.

Evaluation Example 2

Resistivity Measurement

Resistivity of the positive electrode plates manufactured according to Examples 1 to 5 and Comparative Examples 1 to 4 was measured in a thickness direction using a resistivity measurement device (CIS Company). The measurement results are shown in Table 1 below.

The thickness of the current collector of each of the positive electrode plates was 15 μm, and the thickness of the positive active material layer of each of the positive electrode plates was about 60 to about 180 μm. That is, the total thickness of each of the positive electrode plates was about 75 to about 195 μm. The positive electrode plates were each prepared as a round sample having an area of 3.14 $cm^2$ and a radius of 1 cm.

TABLE 1

|  | Resistivity [Ω · m] |
|---|---|
| Example 1 | 46.4 |
| Example 2 | 40.8 |
| Example 3 | 19.6 |
| Example 4 | 24.3 |
| Example 5 | 37.1 |
| Comparative Example 1 | 62.7 |
| Comparative Example 2 | 48.1 |
| Comparative Example 3 | 27.9 |
| Comparative Example 4 | 34.4 |

As shown in Table 1, the resistivity of the positive electrode plates of each of Examples 1 to 5 was reduced compared to the resistivity of the positive electrode plate of Comparative Example 1. From these results, it was confirmed that the presence of $WO_3$ contributed to a decrease in the resistivity of the positive electrode plates of Examples 1-5. That is, the positive electrode plates including $WO_3$ showed higher electric conductivity than the positive electrode plate that did not include $WO_3$.

Also, regarding the positive electrode plates of Comparative Examples 2-4 including $MoO_3$, an amount of $MoO_3$ needed to prevent the corrosion was greater (i.e., 5 times greater) than that of $WO_3$, and also, when $MoO_3$ was used, resistance was increased compared to when $WO_3$ was used.

Evaluation Example 3

Impedance Measurement

Impedance of the coin cells manufactured according to Examples 6 to 10 and Comparative Example 5 were measured using an impedance analyzer (Material Mates 7260) according to a 2-probe method. The frequency range was about 100 kHz to about 10 mHz, the Va (sinus amplitude) was 10 mV, and the Pw (period before the measurement at each frequency) was 0.1. The measurement results are shown in FIG. 4.

Figure 4:
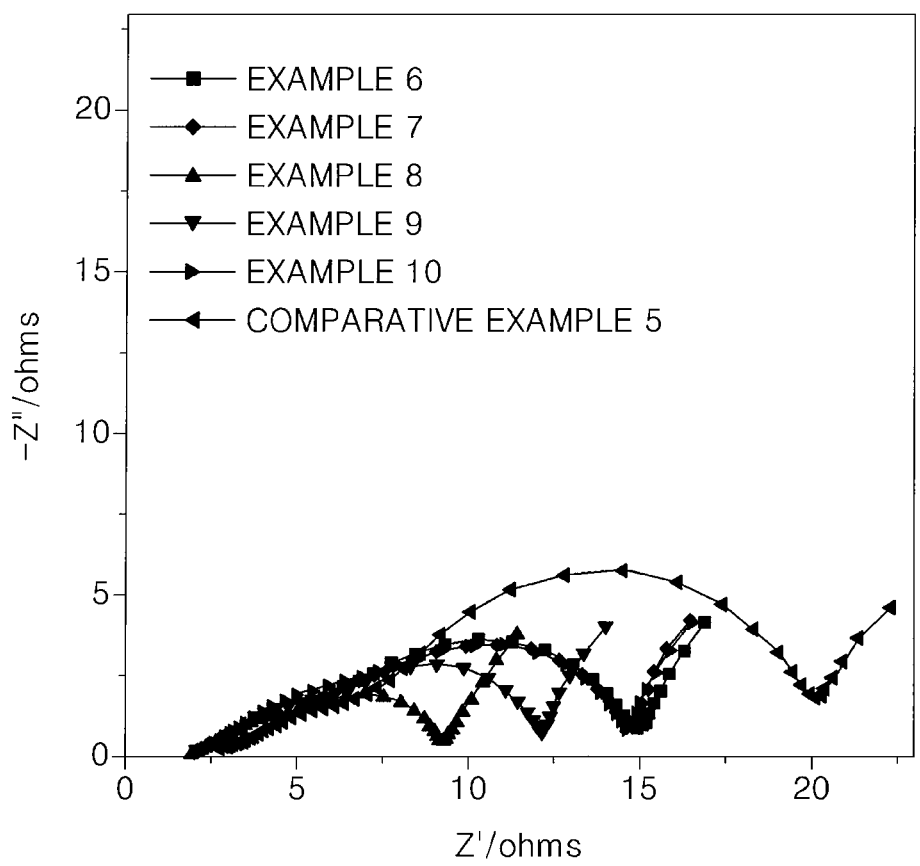
FIG. 4 is a graph comparing the impedance measurement results of the lithium batteries manufactured according to Examples 6 to 10 and Comparative Example 5.

As shown in FIG. 4, the impedance of each of the coin cells manufactured according to Examples 6 to 10 was lower than the impedance of the coin cell manufactured according to Comparative Example 5. In particular, the impedance of each of the coin cells manufactured according to Examples 8 to 9 was substantially lower than the impedance of the coin cell manufactured according to Comparative Example 5.

Evaluation Example 4

Charging and Discharging Characteristics Evaluation

The coin cells manufactured according to Examples 6 to 10 and Comparative Examples 5-8 were charged and discharged 100 times with a constant current of 4.4 mA/g (1.0 C rate) within a voltage range of about 3.0 to about 4.2V at a temperature of 25° C. Lithium metal was used as the reference electrode. The charging and discharging results obtained at room temperature are shown in Table 2 below. The capacity retention rate is calculated according to Equation 1 below.

Capacity retention rate [%]=[discharge capacity in $100^{th}$ cycle/discharge capacity in $1^{st}$ cycle]×100     Equation 1

TABLE 2

|  | Capacity retention rate [%] |
| --- | --- |
| Example 6 | 81.4 |
| Example 7 | 85.6 |
| Example 8 | 94.3 |
| Example 9 | 90.9 |
| Example 10 | 87.0 |
| Comparative Example 5 | 78.9 |
| Comparative Example 6 | 80.7 |
| Comparative Example 7 | 85.4 |
| Comparative Example 8 | 78.1 |

As shown in Table 1, the coin cells manufactured according to Examples 6 to 10 showed improved cycle characteristics (capacity retention rate) over the coin cells manufactured according to Comparative Examples 5-8.

As described above, the positive electrode materials for a lithium battery, according to embodiments of the present invention, have high electric conductivity and substantially prevent the corrosion of an aluminum substrate. Accordingly, due to the inclusion of a positive electrode including the positive electrode materials, the resulting lithium battery has decreased resistance of the electrode plate, high rate characteristics, and good lifespan characteristics.

While the present invention has been described in connection with certain exemplary embodiments, it is understood by those of ordinary skill in the art that various modification can be made to the described embodiments without departing from the spirit and scope of the present invention as defined in the attached claims.

What is claimed is:

1. A positive electrode slurry composition for a lithium battery, the positive electrode slurry composition comprising: a positive active material; an aqueous binder; tungsten trioxide ($WO_3$) having an average particle diameter of about 5 nm to about 5 μm; and water.

2. The positive electrode slurry composition of claim 1, wherein an average particle diameter of the tungsten trioxide ($WO_3$) is about 5 nm to about 1 μm.

3. The positive electrode slurry composition of claim 1, wherein the tungsten trioxide ($WO_3$) is present in the positive electrode slurry composition in an amount of about 0.001 to about 50 parts by weight based on 100 parts by weight of the positive active material.

4. The positive electrode slurry composition of claim 1, wherein the positive active material comprises at least one of lithium cobalt-based oxide, lithium nickel cobalt manganese-based oxide, or lithium nickel cobalt aluminum-based oxide.

5. The positive electrode slurry composition of claim 1, wherein the aqueous binder comprises a material selected from the group consisting of carboxymethylcellulose, hydroxyethylcellulose, hydroxypropylcellulose, hydroxypropylmethylcellulose, polyvinylidenefluoride, polytetrafluoroethylene, polyethylene, polypropylene, polybutadiene, butyl rubber, fluorine rubber, polyethyleneoxide, polyvinylalcohol, polyacrylic acid and salts thereof, polyvinylpyrrolidone, polyepichlorohydrin, polyphosphazene, polyacrylonitrile, polystyrene, polyvinylpyridine, chlorosulfonated polyethylene, latex, polyester resins, acryl resins, phenol resins, epoxy resins, polymers of propylene and an olefin having 2 to 8 carbon atoms, copolymers of (meth)acrylic acid and (meth)acrylic acid alkyl ester, and combinations thereof.

6. The positive electrode slurry composition of claim 1, wherein the aqueous binder is present in the positive electrode slurry composition in an amount of about 0.1 to about 10 parts by weight based on 100 parts by weight of the positive active material.

7. The positive electrode slurry composition of claim 1, further comprising a conductive agent.

8. The positive electrode slurry composition of claim 7, wherein the conductive agent comprises at least one of natural graphite, artificial graphite, carbon black, acetylene black, Ketjen black, carbon fiber, carbon nanotube, metal powder, metal fiber, or a conductive polymer.

9. A positive electrode for a lithium battery, the positive electrode comprising:
a metal substrate that is capable of being corroded by a strong alkali; and
a positive electrode layer on at least one surface of the metal substrate, the positive electrode layer comprising a dried layer of the positive electrode slurry composition of claim 1.

10. The positive electrode of claim 9, wherein the metal substrate is an aluminum substrate.

11. A lithium battery comprising:
the positive electrode of claim 9;
a negative electrode facing the positive electrode and comprising a negative active material; and
an electrolyte between the positive electrode and the negative electrode.

* * * * *